US008571096B2

(12) United States Patent
Fischer (10) Patent No.: US 8,571,096 B2
(45) Date of Patent: Oct. 29, 2013

(54) ULTRA-WIDEBAND COMMUNICATION SYSTEM FOR VERY HIGH DATA RATES

(75) Inventor: Gunter Fischer, Frankfurt (DE)

(73) Assignee: IHP, GmbH, Frankfurt (DE)

( * ) Notice: Subject to any disclaimer, the term of this patent is extended or adjusted under 35 U.S.C. 154(b) by 980 days.

(21) Appl. No.: 10/574,720

(22) PCT Filed: Oct. 7, 2004

(86) PCT No.: PCT/EP2004/011482
§ 371 (c)(1),
(2), (4) Date: Sep. 5, 2007

(87) PCT Pub. No.: WO2005/036768
PCT Pub. Date: Apr. 21, 2005

(65) Prior Publication Data
US 2008/0285663 A1    Nov. 20, 2008

(30) Foreign Application Priority Data
Oct. 9, 2003    (DE) .................................. 103 47 395

(51) Int. Cl.
*H03K 7/04*    (2006.01)
*H03K 7/08*    (2006.01)
*H04L 27/00*   (2006.01)

(52) U.S. Cl.
USPC ............ 375/239; 375/238; 375/242; 375/295

(58) Field of Classification Search
USPC ......... 375/211, 219, 220, 222, 238, 237, 239, 375/242, 259, 268, 271, 278, 295, 298, 300, 375/302, 316, 320, 322, 324, 341, 353
See application file for complete search history.

(56) References Cited

U.S. PATENT DOCUMENTS

| | | | |
|---|---|---|---|
| 5,677,927 A | 10/1997 | Fullerton et al. | |
| 5,687,169 A | 11/1997 | Fullerton | |
| 6,055,266 A * | 4/2000 | Nakamura | 375/140 |
| 6,571,089 B1 | 5/2003 | Richards et al. | |
| 6,925,130 B2 * | 8/2005 | Chan | 375/295 |
| 6,950,485 B2 * | 9/2005 | Richards et al. | 375/355 |
| 2003/0072290 A1 * | 4/2003 | Hwang et al. | 370/342 |

(Continued)

FOREIGN PATENT DOCUMENTS

WO    WO 96/41432    12/1996

OTHER PUBLICATIONS

H. Shalaby, "Optical OPPM-CDMA receivers with chip-level detectors," *IEE Proc.-Commun.*, vol. 148, No. 1, Feb. 2001, pp. 31-37.

(Continued)

*Primary Examiner* — Sam K Ahn
*Assistant Examiner* — Linda Wong
(74) *Attorney, Agent, or Firm* — Ware, Fressola, Maguire & Barber LLP (57) ABSTRACT

The invention concerns an ultra-wideband information transmission method comprising a first encoding step on the part of the transmitter, in which a pulse group which is formed from a predetermined number of individual pulses is encoded in dependence on values of a random number sequence, and a correlation step on the part of the receiver in which correlation of a reception signal with a signal pattern is effected, wherein the signal pattern corresponds to the whole pulse group to be expected when using the same values of the random number sequence.

26 Claims, 3 Drawing Sheets

(56) References Cited

U.S. PATENT DOCUMENTS

| | | | |
|---|---|---|---|
| 2003/0128783 A1* | 7/2003 | Richards et al. | 375/355 |
| 2003/0194979 A1* | 10/2003 | Richards et al. | 455/216 |
| 2004/0179580 A1* | 9/2004 | Yamaguchi | 375/141 |
| 2004/0179582 A1 | 9/2004 | Suzuki | |
| 2006/0166619 A1* | 7/2006 | Roberts | 455/39 |
| 2008/0292037 A1* | 11/2008 | Fujita et al. | 375/354 |

OTHER PUBLICATIONS

R. Wilson & R. Scholtz, "Comparison of CDMA and modulation schemes for UWB radio in a multipath environment," *IEEE, Globecom* 2003, pp. 754-758.

J. Ney da Silva & M. de Campos, "Performance comparison of binary and quaternary UWB modulation schemes," *IEEE, Globecom* 2003, pp. 789-793.

S. Zeisberg, C. Müller & J. Siemes, "Performance limits of ultra-wideband basic modulation principles," *IEEE*, Nov. 25-29, 2001, San Antonio, Texas, pp. 816-820.

M. Win & R. Scholtz, "Ultra-wide bandwidth time-hopping spread-spectrum impulse radio for wireless multiple-access communications," *IEEE Transactions on Communications*, vol. 48, No. 4, Apr. 2000, pp. 679-691.

H. Park & J. Barry, "Modulation analysis for wireless infrared communications," *IEEE*, Jun. 18-22, 1995, Seattle, Washington, pp. 1182-1186.

Y. Souilmi & R. Knopp, "On the achievable rates of ultra-wideband PPM with non-coherent detection in multipath environments," *IEEE*, May 2003, pp. 3530-3534.

G. Durisi & S. Benedetto, "Performance evaluation and comparison of different modulation schemes for UWB multiaccess systems," *IEEE*, May 2003, pp. 2187-2191.

Time Domain Corporation, "PulsON technology overview," Jul. 2001, 13 pages.

* cited by examiner

ULTRA-WIDEBAND COMMUNICATION SYSTEM FOR VERY HIGH DATA RATES

CROSS REFERENCE TO RELATED APPLICATIONS

This application is for entry into the U.S. national phase under §371 for International Application No. PCT/EP2004/11482 having an international filing date of Oct. 7, 2004, and from which priority is claimed under all applicable sections of Title 35 of the United States Code including, but not limited to, Sections 120, 363 and 365(c), and which in turn claims priority under 35 USC §119 to German Patent Application No. 103 47 395.5 filed on Oct. 9, 2003.

BACKGROUND OF THE INVENTION

1. Technical Field

The present invention concerns an ultra-wideband information transmission method. In addition the invention concerns an ultra-wideband transmitting apparatus, an ultra-wideband receiving apparatus and an ultra-wideband transmitting-receiving apparatus.

2. Discussion of Related Art

Ultra-wideband (UWB) data transmission methods operate with signals in pulse form, which are so shaped and arranged in the time domain that the result is a spectral power density distribution which is as homogenous as possible but which never exceeds the maximum permissible interference power within various frequency bands. UWB methods are attractive as they do not require a license and they allow high transmission capacities.

Instead of the modulated narrow-band carrier signals which are usual in wireless transmission, in the case of UWB data transmission methods short pulses of a pulse length in the range of nanoseconds or shorter are produced, which are of a broad frequency spectrum, for example from 3.1 GHz to 10.6 GHz. Data transmission methods are generally referred to as ultra-wideband (UWB) methods if the quotient of the sum and the difference of the two limit frequencies is 8 or less. In the stated example the quotient is about 2.1. In accordance with an alternative definition of ultra-wideband data transmission methods the bandwidth is to be at least 500 MHz.

Existing pulse-based ultra-wideband transmission methods suffer from the problem that they are only inadequately suitable for very high data rates. The reason for this lies primarily in the intersymbol interference (ISI) which increases upon an increase in the data rate.

An example of such a method is the method known by the trade mark "PulsON" from Time Domain, described in the document "PulsON® Technology Overview", published on the Internet, for example at http://www.timedomain.com/Files/downloads/techpapers/PulsONOverview7_01.pdf.

With that method the information to be transmitted is encoded in the form of pulse position modulation. The spacing in respect of time of Gaussian single-cycle pulses used in that method, in relation to the respectively preceding pulse within a pulse sequence representing the bit is either 100 ps less ("0") or 100 ps greater ("1") than a bit-overlapping time spacing average value of 100 ns.

In that previously known method different channels are formed by an encoding in which single-cycle pulses are dispatched with a delay which obeys a pseudo-random sequence. A pseudo-random sequence is uniquely associated with each channel. Transmitter and associated receiver must have the same pseudo-random sequence in order to be able to communicate with each other on a channel. The receiver firstly decodes the channel encoding in the received signal by means of the pseudo-random sequence available to the receiver and then ascertains the information which is impressed on the signal by pulse position modulation.

For known systems like that one the upper limit of the possible data rate is determined by the following consideration: if there is a wish to increase the data rate the carriers of the information, the pulses (chips), must be emitted at spacings which are shorter in respect of time. If however those time spacings become very short, typically less than 50 ns, then signals of one and the same transmitter pulse, which overlap portion-wise in respect of time at the receiver antenna, can interfere, those signals arriving there over different paths for example by virtue of reflection phenomena or multi-path propagation. The association of individual pulses (chips) with a symbol (bit) at the receiver end is in that way made more difficult or becomes impossible. That means that the transmission is interfered with and the highest possible data rate exceeded.

The document Zeisberg, S; Müller, C.: Siemes, J.: Performance Limits of Ultra-Wideband Modulation Principles; IEEE Global Telecommunications Conference GLOBECOM01, 25 to 29 Nov. 2001, Vol. 2, pages 816-820 discloses distributing bit information to be transmitted in a UWB transmission method over many individual pulses (chips). As the value of a bit is distributed to a symbol over a relatively large number of individual pulses, reference is made in this connection to transmitter-end time spreading of the symbol. In the receiver the bit value is reconstructed by adding up the energy of the individual pulses ("soft integration of chip correlation"). Spreading of the information to many pulses however results in a dramatic reduction in the data throughput. To avoid that effect that document describes the possibility of introducing time overlap of different symbols ("time overlap between transmitted symbols"). An example of such a method is referred to as "overlapping pulse position modulation" (OPPM). The overlap of individual pulses of a symbol with those of other symbols however leads to unwanted collisions and thus bit errors.

DISCLOSURE OF INVENTION

The object of the invention is to provide an UWB transmission method which permits low-error data transmission even at particularly high data rates.

That object is attained by an ultra-wideband transmission method as set forth below, an ultra-wideband transmitting apparatus as set forth below, an ultra-wideband receiving apparatus as set forth below and an ultra-wideband transmitting-receiving apparatus as set forth below.

In accordance with a first aspect of the invention there is provided an ultra-wideband information transmission method which comprises the following steps:

The transmitter performs a first encoding step in which a pulse group formed by a predetermined number of individual pulses is encoded in dependence on values of a random number sequence. The receiver performs a correlation step in which correlation of a reception signal with a signal pattern is performed. In that situation the signal pattern corresponds to the whole pulse group to be expected when using the same values of the random number sequence.

In the ultra-wideband information transmission method according to the invention the transmitter, for the transmission of items of information, uses pulse groups which are formed from a predetermined number of individual pulses. Those pulse groups form the carrier of the items of information to be transmitted. In contrast they initially do not contain the items of information themselves which are to be transmitted. A second encoding step is required for the transmission of information by the pulse group, that second encoding step being the subject-matter of preferred embodiments described further hereinafter.

In the method according to the invention moreover a pulse group is formed at the transmitter end from a predetermined number of individual pulses in such a way that the individual pulses which form a group partially overlap in respect of time after the pulse forming operation. The time sequence of the individual pulses of a pulse group is therefore so close that the individual pulses partially overlap after the pulse forming operation. Accordingly the method according to the invention overcomes the idea on which known UWB information transmission methods are based, that the mean spacing between two pulses must be larger by a multiple than the duration thereof. In accordance with that procedure which prevailed hitherto the individual pulses remain independent of the employed modulation methods and encoding options of individual events to be detected at the receiver. In that respect it was irrelevant in regard to the known methods whether the information to be transmitted was distributed to one or many pulses.

The underlying idea of the present invention in contrast is that of forming pulse groups of individual pulses which by virtue of partial time overlap of the individual pulses and encoding have an individual structure in the form of the signal amplitude configuration in respect of time. In other words the duration of the individual pulses is longer than their spacing with respect to the next pulse, whereby superpositioning gives rise to a resulting individual form of the group which is dependent on the nature and duration of the time overlap of the individual pulses. A substantial distinction in relation to the known OPPM method is that, in the transmission method according to the invention, the individual pulses of one and the same symbol are brought into a condition of time overlap with an advantageous effect. In contrast OPPM uses symbols comprising individual pulses, wherein the individual pulses are at a great spacing in respect of time from each other. Different symbols can be pushed over each other in respect of time in the case of OPPM. In that respect the individual pulses of different symbols may not cross in respect of time in order to avoid transmission errors.

In the method according to the invention detection of the transmitted pulse group at the receiver is only possible as a whole, more specifically by the encoding used at the transmitter end being known to the receiver. In the method according to the invention the receiver knows in particular the number of individual pulses per pulse group. Using the random sequence which is common with the transmitter the receiver forms corresponding signal patterns and performs correlation of a reception signal with a respective signal pattern. In that case on the one hand at the transmitter end the pulse group is encoded in dependence on values of a random number sequence and on the other hand at the receiver end the same values of the random number sequence are used in formation of the signal pattern. The method of the present aspect of the invention presupposes that the transmitter and the receiver have the same random number sequence and effect synchronization of the random number sequence. That however is easy to implement with known means.

The crucial advantage of the method according to the invention is that a pulse group by way of the encoding operation in the first encoding step contains a unique marking which makes it distinguishable from other pulse groups. Accordingly the receiver can distinguish on the one hand between the pulse groups of different transmitters which use different codes. Correlation with a signal pattern which corresponds to the whole pulse group to be expected further affords the possibility of recognizing time-displaced copies of a pulse group (for example due to multi-path propagation or reflection). That in turn makes it possible to reduce the time spacing between the pulse groups and thus increase the transmitted data rate. So-called RAKE receivers can be used in order to bring together the signal energy of time-displaced copies of a pulse group in the receiver. It is therefore possible to dispense with observing long time spacings. The method according to the invention still operates for example with time spacings in respect of the individual pulses from each other in the region of some 100 ps. The time superpositioning of the individual pulses results in a signal pattern which is characteristic of the transmitted pulse group and which is dependent on the values of the random number sequence. As the receiver has the same random number sequence and the signal pattern passed to the correlation operation has a corresponding encoding, it is also possible to recognize signal groups with time-overlapping individual pulses and to decode them.

The ultra-wideband information transmission method according to the invention, as already mentioned above, operates independently of the nature of information encoding.

The pulse groups which are encoded according to the invention firstly form only the information carrier. Encoding of the information in the pulse group can be effected using ordinary methods. The receiver uses the same method of information encoding, for forming the signal pattern. In that way the transmitter can then not only recognize a pulse group intended for it but also decode the information contained therein.

The method according to the invention accordingly allows a receiver to recognize and decode signals intended for it, even at a high data rate.

With a sufficient number of individual pulses in a pulse group sufficient energy is transmitted, which permits the receiver to ascertain encoded information.

In a preferred embodiment of the method according to the invention there is provided a second encoding step on the part of the transmitter, which can be effected in respect of time prior to, during or after the first encoding step. In the second encoding step at least one bit value to be transmitted as information in the pulse group is encoded in accordance with a predetermined encoding rule. The encoding rule may provide for example that the phase of the individual pulses is respectively modulated or not modulated according to the bit value involved. Modulation may include for example a phase shift by the value $\phi$. It is to be noted that the second encoding step is effected in addition to the first encoding step. In other words, if the encoding rule states that no modulation is carried out for the transmission of a given bit value, then the pulse group alone is encoded in accordance with the first encoding step.

Preferably to ascertain the transmitted bit value in the correlation step the receiver performs correlation of the reception signal with a first and second signal pattern to be expected. In that respect the first and the second signal pattern are encoded with the same values of the random number sequence. The first signal pattern however corresponds to a pulse group which is encoded in the second encoding step with a first bit value and the second signal pattern corresponds to a pulse group which is encoded in the second encoding step with a second bit value which is complementary to the first one. The correlation result will show a result different from 0 depending on the respective signal received from the transmitter only upon correlation with one of the two signal patterns. The transmitted information can be easily ascertained in that way.

Preferably correlation of the reception signal with the first and the second signal patterns is effected in parallel. It is however also possible for correlation with the two signal patterns to be carried out in succession.

Different encoding methods are also conceivable for the first encoding step of the method according to the invention. In a preferred embodiment by way of example the individual pulses of a pulse group are phase-modulated in dependence on the respectively current value of the random number sequence. In other words, each individual pulse is encoded in accordance with a value, only associated therewith, of the random number sequence. For a pulse group of 8 individual pulses therefore 8 values of the random number sequence are used.

Preferably the transmitter additionally implements modulation of the spacing in respect of time of successive pulse groups. That step is also referred hereinafter as first spacing modulation. That provides that the spectral energy distribution of the signals emitted from the transmitter over the entire frequency range used does not exceed the mask prescribed by the regulatory authorities. A particularly simple variant provides that the first spacing modulation is effected in dependence on the random number sequence. In that way the additional synchronization steps between transmitter and receiver, which are necessary when using other random number sequences, can be eliminated.

Channel encoding can also be achieved in a simple fashion with the information transmission method according to the invention. For that purpose in a preferred embodiment by way of example the transmitter and the receiver select the same random sequence from a number of random sequences. Accordingly the first encoding step includes channel encoding at the same time. Receivers which currently access other random number sequences will not recognize any signal intended for them in the correlation step.

In a further embodiment by way of example of the method according to the invention the transmitter additionally effects modulation of the spacing in respect of time of the individual pulses of the pulse group from each other in dependence on values of the random number sequence. The robustness of the radio channel and spectral energy distribution can be further optimized in that way. The transmitted signals gain in individuality, which facilitates recognition in the receiver.

In order to ensure synchronization between transmitter and receiver a further embodiment by way of example provides for the implementation of synchronization of the random sequence prior to the commencement of information transmission. In a further embodiment the transmitter transmits to the receiver a training sequence of pulse groups, which is known to the receiver. In order further to increase the data rate it can be provided in the method according to the invention that two bit values are transmitted in a pulse group. In that case a first bit value is encoded in a first predetermined number of individual pulses and a second bit value in the remaining number of individual pulses. Depending on the respective number of individual pulses in a pulse group that principle can also be used for further increasing the data rate by for example four or eight bits being transmitted per pulse group. Preferably in this embodiment the receiver produces a corresponding number of signal patterns for ascertaining the transmitted bit values in the correlation step. Thus for example four signal patterns are used for correlation purposes if two bit values are encoded in a pulse group.

For adaptation to current transmission conditions, a further embodiment by way of example of the ultra-wideband information transmission method according to the invention provides for ascertaining a current value of a parameter dependent on the instantaneous transmission conditions and establishing the number of individual pulses per pulse group in dependence on the ascertained current value. The encoding depth like the energy transmitted per bit value is increased with the number of individual pulses. In that way, even under disadvantageous transmission conditions, information communication can take place, even if at a slightly reduced transmission rate.

In accordance with a second aspect of the invention there is provided an ultra-wideband transmitting apparatus having a pulse group generator. The pulse group generator includes a pulse generator which is adapted to deliver individual pulses at a predetermined time spacing from each other. In addition there is a code generator which is adapted to deliver random signals dependent on the values of a random number sequence. Furthermore the pulse group generator includes an encoding unit which is adapted to encode an individual pulse delivered or to be delivered by the pulse generator in dependence on the current random signal. Finally the pulse group generator includes a control unit which is connected to the pulse generator and adapted to actuate the pulse generator at predetermined moments in time for the delivery of a pulse group with a predetermined number of encoded individual pulses at predetermined time spacing from each other.

The ultra-wideband transmitting apparatus permits the transmission of items of information by means of the method in accordance with the first aspect of the invention.

In a preferred embodiment by way of example of the ultra-wideband transmitting apparatus according to the invention the control unit is adapted to actuate the pulse generator to effect modulation also of the spacing in respect of time of successive pulse groups (first spacing modulation). In a further embodiment by way of example of the invention the control unit is adapted to control the first spacing modulation in such a way that the spectral energy distribution of signals emanating from the transmitter does not exceed predetermined limit values.

In a further embodiment by way of example of the ultra-wideband transmitting apparatus according to the invention the first spacing modulation is effected in dependence on the random number sequence.

In a further embodiment by way of example the control unit is adapted to actuate the pulse generator for modulation of the spacing in respect of time of the individual pulses of the signal pulse group from each other in dependence on values of the random number sequence (second spacing modulation).

In accordance with a third aspect of the invention there is provided an ultra-wideband receiving apparatus having a pulse group generator. The pulse group generator corresponds to the ultra-wideband transmitting apparatus according to the invention. The signal pattern which the receiving apparatus according to the invention produces corresponds to the pulse group produced internally in the transmitting apparatus. Preferably the pulse group generator of the receiving apparatus additionally has a filter device which is adapted to modify the pulse group in accordance with a predetermined filter characteristic. The filter characteristic preferably corresponds to the filter characteristic of the antenna of the transmitter. Preferably further known influencing parameters are also taken into consideration in the filter characteristic. That can be appropriate in particular in the case of fixedly installed transmission arrangements in which known sources of signal distortion phenomena or reflection phenomena on the transmission path can be taken into consideration.

In a further embodiment by way of example the pulse group generator of the receiving apparatus has a second encoding unit which is adapted to encode at least one bit value in the pulse group in accordance with a predetermined encoding rule.

In this embodiment the second encoding unit is preferably adapted to additionally encode in a copy of the pulse group the complementary bit value, in accordance with the predetermined encoding rule. In that case the pulse group generator outputs a first and a second signal pattern with complementary bit values. They can then be used in the correlation step for ascertaining the bit value encoded in a reception signal.

Preferably the correlation unit has two correlators of which the first ascertains a correlation of the reception signal with the first signal pattern and the second ascertains a correlation of the reception signal with the second signal pattern. Such an arrangement permits parallel ascertainment of the transmitted information value. Only one of the two correlators will "respond" to the reception signal. The transmitted information is then to be clearly recognized from which correlator has responded to the reception signal.

In accordance with a fourth aspect of the invention there is provided an ultra-wideband transmitting-receiving apparatus having an ultra-wideband transmitting apparatus in accordance with the second aspect of the invention and an ultra-wideband receiving apparatus in accordance with the third aspect of the invention.

Preferred embodiments of the transmitting-receiving apparatus according to the invention will be apparent from the above-described embodiments by way of example of the transmitting apparatus and the receiving apparatus.

BRIEF DESCRIPTION OF THE DRAWINGS

Further advantages and features of the invention are described hereinafter by means of embodiments by way of example with reference to the Figures in which.

DETAILED DESCRIPTION

Figure 1:
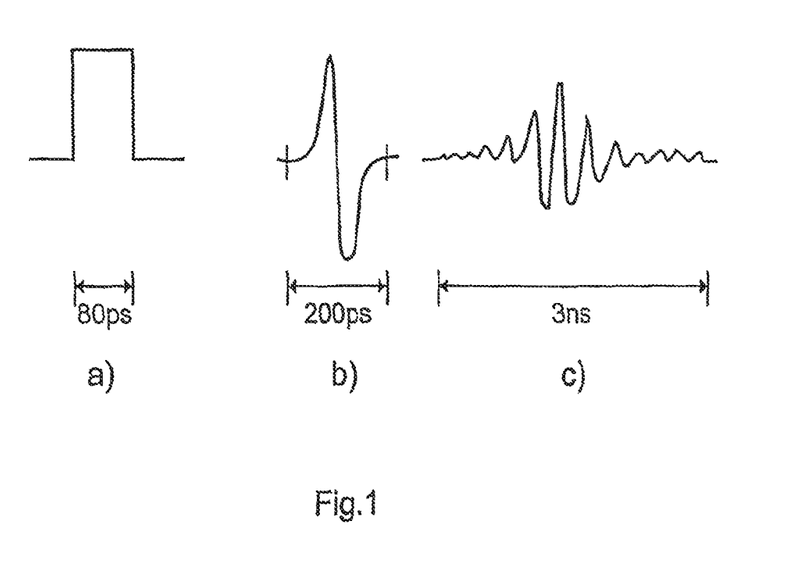
FIG. 1 shows an individual pulse in ideal form (a), slightly distorted form (b) and typically received form (c)

FIG. 1a) shows a pulse form of an individual pulse as forms the basis for an embodiment by way of example of the present invention as an ideal (non-real) pulse form. The pulse form shown in FIG. 1a is a rectangular pulse. The edges of the rectangular pulse are at a time spacing from each other of 80 ps. By virtue of the ideally vertical rising and falling edges of the rectangular pulse it has an infinitely wide frequency spectrum. Real pulse forms which can be achieved with ultra-wideband transmitters in that time range deviate from the rectangular shape even if the pulse generator used is capable of producing an almost ideal rectangular pulse.

FIG. 1b) shows as an embodiment by way of example of a real pulse form a so-called Gaussian monocycle. The Gaussian monocycle illustrated here has in its amplitude firstly a positive deflection which falls from the maximum along a falling edge to a negative maximum deflection of equal amplitude to the positive maximum deflection. The amplitude then rises to its initial value again. That pulse form is mirror-symmetrical about a vertical straight line extending through the zero passage of the falling edge. The width in respect of time of the Gaussian monocycle illustrated here is 200 ps. Such a Gaussian monocycle occurs for example by virtue of the limited filter characteristic of the components used in a transmitter from an ideal rectangular pulse as is shown in FIG. 1a).

FIG. 1c) shows a pulse form which corresponds to the signal of an individual pulse, the signal being emitted by an ultra-wideband transmitter. The illustrated pulse form corresponds in its amplitude to a plurality of oscillations which are grouped approximately symmetrically about a central maximum deflection. The amplitude of the oscillation maxima and minima decreases towards the edges. The overall pulse form extends in time over between about 1 and 2 ns.

The time details specified hereinbefore in relation to FIGS. 1a) through 1c) are to be taken as examples. It will be appreciated that, depending on the respective components employed in a transmitter or receiver, different pulse widths and forms can also be achieved, which are suitable in the same manner for carrying out the method according to the invention.

In the embodiments by way of example set forth hereinafter it is assumed that the transmitter emits individual pulses of the pulse form shown in FIG. 1c), by virtue of the spectral filter characteristic of the components used in the transmitter. That represents a worse-case scenario having regard to the distinguishability of the individual pulses on the basis of their pulse form. The individual pulses overlap in respect of time and cause either a strengthening or an attenuation effect in the reception signal by virtue of the interference. The typical result of this is that individual pulses of a pulse group in the received signal can no longer be separated from each other.

Those considerations form a starting point for the method according to the invention which is now described in greater detail by way of the description of two embodiments by way of example of pulse groups. In the case of the pulse groups described hereinafter with reference to FIG. 2 however ideal individual pulses corresponding to FIG. 1a) are illustrated, for the sake of enhanced clarity of the illustration. It will be appreciated that the real pulse form emitted by the transmitter, depending on the respective spectral bandwidth of the components used therein, is of a pulse form which is respectively more or less similar to the pulse forms shown in FIG. 1.

Figure 2:
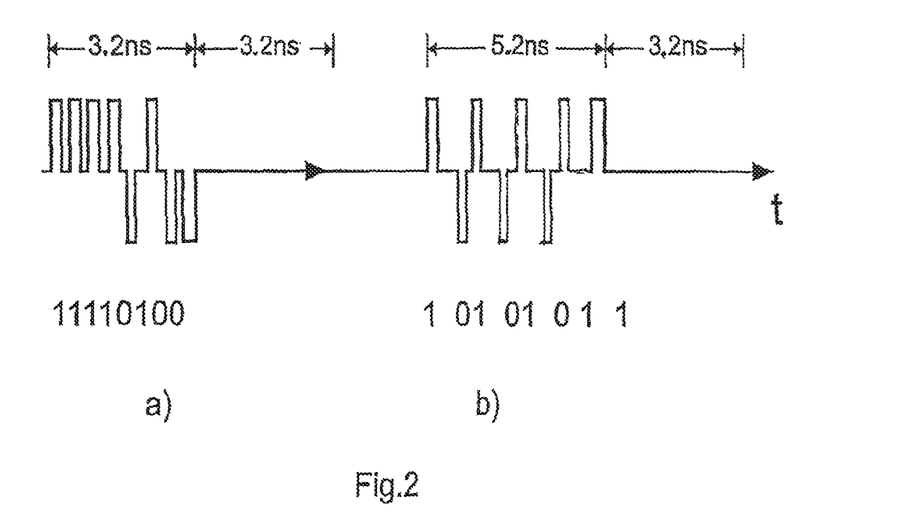
FIG. 2 shows two embodiments by way of example of pulse groups.

FIG. 2 shows two embodiments by way of example of pulse groups as can be produced in the transmission method according to the invention. Both pulse groups are formed from 8 individual pulses with a mean time spacing relative to each other of 400 ps in each case. Here the term time spacing is used to denote the time interval between the commencement of an individual pulse and the commencement of a subsequent individual pulse. In the embodiment shown in FIG. 2a) the time spacing between the individual pulses of the pulse group is fixed and is 400 ps. If a pulse width of 80 ps per ideal pulse group is additionally taken as a basis the time interval embraced by all 8 individual pulses of the pulse group is 3.2 ns. That is what is referred to as the burst duration.

The individual pulses involve a binary phase shift in accordance with the values of a random number sequence. If an individual pulse is formed with a positive amplitude, that is to correspond to a logic 1 in the present embodiments and if the individual pulse is negative that signifies a logic 0 in the present case. The code value is produced for example by means of an 8 bit-wide quasi-random number generator. The code contained in the pulse group in FIG. 2a) accordingly corresponds to "11110100". The pulse group is followed by a rest time (guard time) of 3.2 ns.

The embodiment of a pulse group shown in FIG. 2b) firstly differs from that in FIG. 2a) in the random number code. Here the code is "10101011". Furthermore the pulse group in FIG. 2b) differs from that in FIG. 2a) in that the time spacing between the individual pulses is not uniformly 400 ps but varies. Modulation of the time spacings of the individual pulses also follows the code of the random number sequence. If the code value is a logic 1 then the time spacing relative to the following individual pulse is increased. If the code value is a logic 0 the time spacing is unchanged in relation to the predetermined value of 400 ps. If an increase in the time spacing between two individual pulses from 400 to 800 ps in the case of a logic 1 is taken as an example for time modulation, that involves a burst duration of 5.2 ns which in turn is followed by a guard time of 3.2 ns. It will be appreciated that it is also possible to use other time spacings for time modulation. In the case of the embodiment of FIG. 2b) the burst duration is dependent on the current code of the pulse group. The delay disappears if all individual pulses bear the code 0. The delay increases depending on the respective modulation spacing selected. It is at the highest for the code 255 which corresponds to 8 logic ones.

For encoding an information value in the pulse groups shown in FIGS. 2a) and b) further phase modulation can be effected in an embodiment. For a logic 1 to be transmitted the whole pulse sequence is inverted and for a logic 0 to be transmitted the whole pulse sequence is not inverted. As the receiver has the original code of the random number sequence used in the received pulse group it can establish whether the incoming signal thereat of a pulse group is or is not inverted in relation to the current values of the random number sequence and can thus decode the contained information value. A possible technical implementation of code decoding for ascertaining the transmitted information value is described hereinafter with reference to FIG. 4.

Figure 3:
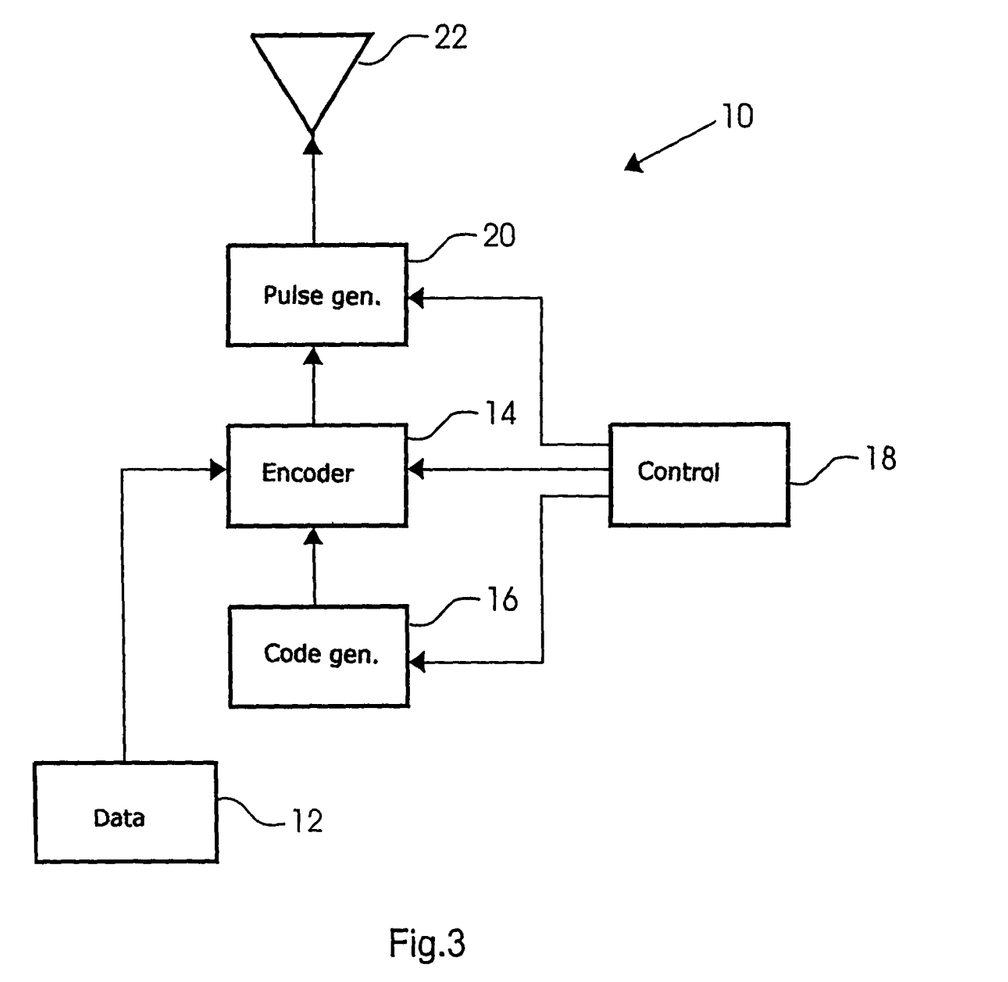
FIG. 3 shows an embodiment by way of example of an ultra-wideband transmitter according to the invention.

FIG. 3 shows an embodiment by way of example of an ultra-wideband transmitter 10. The transmitter has an input 12 for data. The transmitter 10 transmits the data at the data input 12 to a receiver by means of the ultra-wideband data transmission method according to the invention. The data input can deliver for example audio data, image data, video data or other data existing in digital form to an encoder 14 connected downstream thereof. The encoder 14 is connected to a code generator 16 by way of a further input. The code generator 16 is a quasi-random generator which transmits to the encoder a random number code of a width which in different embodiments is either fixedly predetermined or can be predetermined by a control unit 18 in a manner adapted to current transmission conditions. A pulse generator 20 is connected at the input side to the encoder 14 and receives therefrom the control information for producing a pulse group which is encoded with a random code and which carries useful information. The combination of the encoder 14, the code generator 16, the control unit 18 and the pulse generator 20 forms a pulse group generator. The pulse groups produced by the pulse group generator are radiated by way of an antenna 22.

The control unit 18 predetermines for the pulse generator, the code generator and the encoder the number of individual pulses per pulse group and the time spacings between the individual pulses of a pulse group in dependence on the random number sequence. This means that the transmission can be made more robust even in a difficult environment.

In an embodiment the code generator 16 has a number of different quasi-random number sequences, for example in the form of different random sequence generators which can issue random numbers independently of each other. The control unit 18 predetermines for the code generator 16 which random number sequence is to be used for a current transmission. Channel encoding is achieved in that way.

Figure 4:
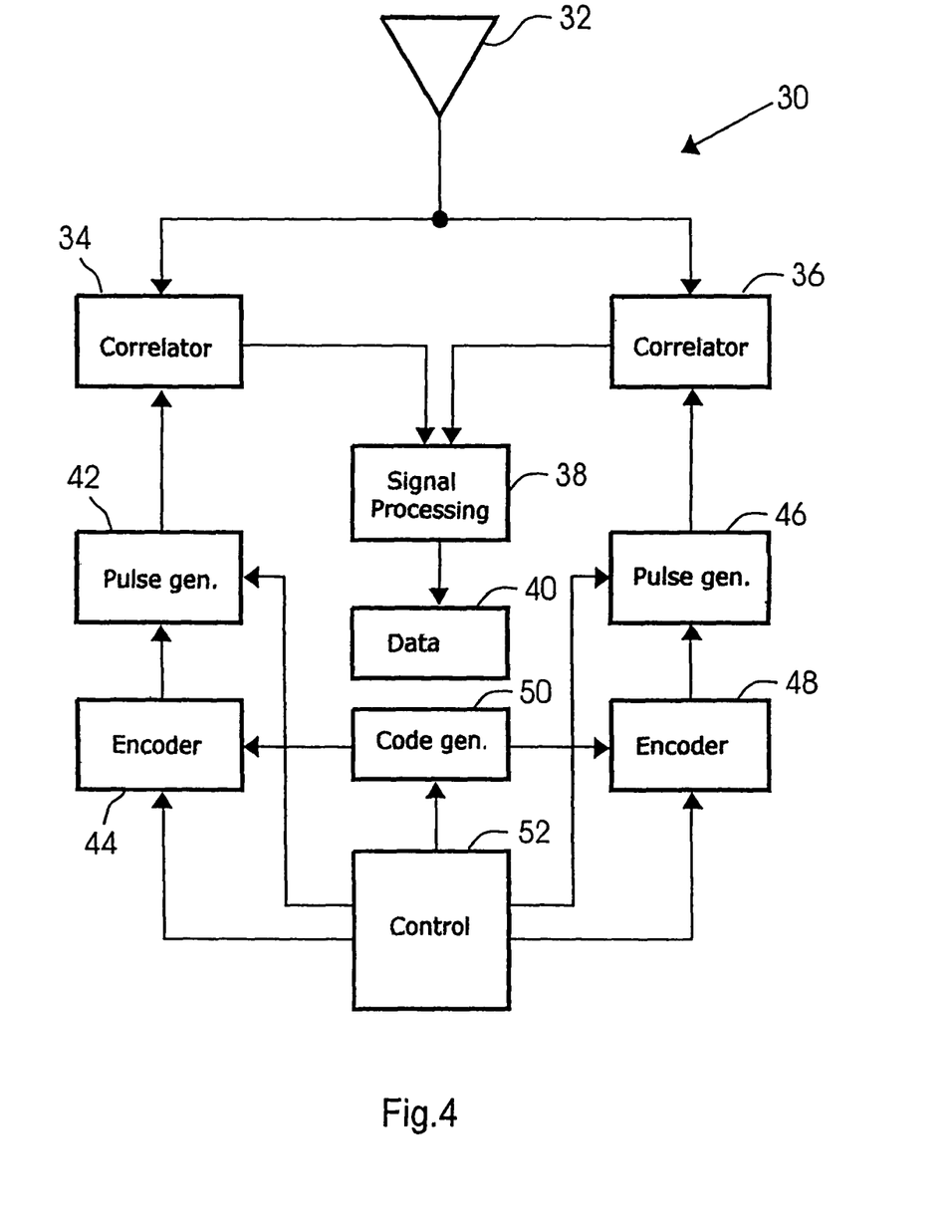
FIG. 4 shows an embodiment by way of example of an ultra-wideband receiver.

FIG. 4 shows an embodiment by way of example of an ultra-wideband receiving apparatus 30. Two correlators 34 and 36 are connected downstream of an antenna 32 in parallel relationship. The two correlators pass their output signals to a signal processing unit 38, the output of which is connected to a data output unit 40.

Connected upstream of the correlators 34 and 36 are two pulse group generators, the function of which corresponds to the pulse group generator at the transmitter end. A pulse generator 42 and an encoder 44 are associated with the correlator 34. A pulse generator 46 and an encoder 48 are associated with the correlator 36. The encoders 44 and 48 receive the same code from a code generator 50. A control unit 52 controls operation of the encoders 44 and 48 as well as the pulse generators 42 and 46 in parallel relationship in the same manner as the control unit 18 of the transmitter in FIG. 3. In addition it is connected at the output side to the code generator 50.

In operation of the receiver shown in FIG. 4 a received signal is passed to the correlators 34 and 36. The correlator 34 determines the correlation of the received signal with a signal pattern of a pulse group, that pattern being based on the current values of the random sequence. In that situation the encoder 44 encodes a logic 1 into the signal pattern which the pulse generator 42 produces. On the other hand the encoder 48 encodes a logic 0 into a signal pattern which the pulse generator 46 produces and which otherwise is based on the same values of the random number sequence which the code generator 50 delivers. If the transmitter and the receiver use the same values of the random number sequence, one of the correlators 34 and 36 will output a significant output signal to the signal processing unit 38 while the other does not have a significant output signal. That pattern firstly shows that a bit was validly transmitted and received. The signal processing unit ascertains from the input at which the signal that is different from 0 is applied, that one of the two correlators 34 and 36 from which the signal originates. Then, the bit information transmitted with the received pulse group can also be ascertained from that information. The respective bit value is passed to the data output unit 40.

An embodiment by way of example of a transmitting-receiving apparatus has a transmitter as shown in FIG. 3 and a receiver as shown in FIG. 4.

The invention claimed is:

1. An ultra-wideband method for communication between a transmitter and a receiver, the method comprising
a pulse forming step on the transmitter side, comprising forming a pulse group from a predetermined number of individual pulses, wherein a duration of the individual pulses is longer than a time spacing between the individual pulses of the pulse group, in such a way that the individual pulses of one and the same pulse group partially overlap in time after the pulse forming step, wherein the pulse forming comprises
a first encoding step on the part of the transmitter, in which the pulse group, is encoded in dependence on values of a random number sequence, and
a correlation step on the part of the receiver, in which correlation of a reception signal with a signal pattern is effected, wherein the signal pattern corresponds to the whole pulse group to be expected when using the same values of the random number sequence and wherein, in the first encoding step, the transmitter effects a modulation of the time spacing between individual pulses of the pulse group in dependence on values of the random number sequence or the transmitter effects a modulation of the phase of the individual pulses in dependence on values of the random number sequence.

2. An ultra-wideband method as set forth in claim 1, further comprising a second encoding step on the part of the transmitter prior to, during, or after the first encoding step, in which at least one bit value to be transmitted as information in the pulse group is encoded in accordance with a predetermined encoding rule.

3. An ultra-wideband method as set forth in claim 2, wherein to ascertain the transmitted bit value in the correlation step a correlation of the reception signal with a first and with a second signal pattern to be expected is effected, wherein the first and second signal patterns are encoded with the same values of the random number sequence and the, wherein first signal pattern corresponds to a pulse group which is encoded in the second encoding step with a first bit value and the second signal pattern corresponds to a pulse group which is encoded in the second encoding step with a second, complimentary bit value.

4. An ultra-wideband method as set forth in claim 3, wherein the correlation of the reception signal with the first and the second signal patterns is effected in parallel.

5. An ultra-wideband method as set forth in claim 1, wherein the transmitter additionally effects a modulation of the time spacing between mutually successive pulse groups (first time spacing modulation).

6. An ultra-wideband method set forth in claim 5, wherein the first time spacing modulation operation is effected in such a way that the spectral energy distribution of signals emanating from the transmitter does not exceed predetermined limit values.

7. An ultra-wideband method as set forth in claim 2, wherein the first time spacing modulation operation is effected in dependence on the random number sequence.

8. An ultra-wideband method as set forth in claim 1, wherein the transmitter and the receiver select the same random sequence from a number of random number sequences, and wherein the first encoding step is used at the same time for channel encoding.

9. An ultra-wideband method as set forth in claim 1, wherein the transmitter and the receiver effect synchronization of the random number sequence prior to the commencement of information transmission.

10. An ultra-wideband method as set forth in claim 1, wherein the transmitter transmits to the receiver a training sequence of pulse groups, that is known to the receiver.

11. An ultra-wideband method as set forth in claim 2, wherein the predetermined encoding rule for encoding of a bit value provides for inverting or non-inverting, depending on the respective bit value, all individual pulses of a pulse group.

12. An ultra-wideband method as set forth in claim 1, wherein two bit values are transmitted in one respective pulse group, and wherein a first bit value is encoded in a first predetermined number of individual pulses of the respective pulse group and a second bit value is encoded in the remaining number of individual pulses of the respective pulse group.

13. An ultra-wideband method as set forth in claim 12, wherein in order to ascertain the transmitted bit values on the part of the receiver in the correlation step, a correlation of the reception signal with four signal patterns to be expected is obtained.

14. An ultra-wideband method as set forth in claim 1, wherein a current value of a parameter, which is dependent on instantaneous transmission conditions, is ascertained, and wherein the number of the individual pulses of the pulse group is determined in dependence on the current value of the parameter.

15. An ultra-wideband transmitting apparatus having a pulse group generator comprising a pulse generator which is adapted to deliver individual pulses at a predeterminable time spacing from each other, a code generator which is adapted to deliver random signals dependent on values of a random number sequence, an encoding unit which is adapted to encode an individual pulse delivered or to be delivered by the pulse generator in dependence on the current random signal, and a control unit which is connected to the pulse generator and which is adapted to actuate the pulse generator at predeterminable moments in time for the delivery of a pulse group with a predetermined number of encoded individual pulses at predetermined time spacings from each other, wherein the control unit is additionally adapted to control the pulse generator and the encoding unit to form the pulse group in dependence on the values of the random number sequence, wherein a duration of the individual pulses is longer than a time spacing between the individual pulses of the pulse group, in such a way that the single-individual pulses of one and the same pulse group overlap in time after the pulse formation, and wherein, in the first encoding step, the transmitter effects a modulation of the time spacing between individual pulses of the pulse croup in dependence on values of the random number sequence or the transmitter effects a modulation of the phase of the individual pulses in dependence on values of the random number sequence.

16. An ultra-wideband transmitting apparatus as set forth in claim 15, wherein the control unit is adapted to actuate the pulse generator to effect a modulation of the time spacing between successive pulse groups.

17. An ultra-wideband transmitting apparatus as set forth in claim 16, wherein the control unit controls the time spacing modulation in such a way that the spectral energy distribution of signals emanating from the transmitter does not exceed predetermined limit values.

18. An ultra-wideband transmitting apparatus as set forth in claim 15, wherein the control unit is adapted to select that random number sequence whose values form the basis for the outputted random signals of the code generator.

19. An ultra-wideband transmitting apparatus as set forth in claim 15, wherein the control unit is adapted to actuate the pulse generator for another modulation of the time spacing of the individual pulses of the pulse group from each other in dependence on values of the random number sequence.

20. An ultra-wideband receiving apparatus having a pulse group generator, the pulse group generator comprising a pulse generator which is adapted to deliver individual pulses at a predeterminable time spacing from each other, a code generator which is adapted to deliver random signals dependent on the values of a random number sequence, a first encoding unit which is adapted to encode an individual pulse delivered or to be delivered by the pulse generator in dependence on the current random signal, and a control unit which is connected to the pulse generator and which is adapted to actuate the pulse generator at predeterminable moments in time for the delivery of at least one signal pattern in the form of a pulse group with a predetermined number of encoded individual pulses at predetermined time spacings from each other, the ultra-wideband receiving apparatus further having a correlation unit, which is connected to the pulse group generator and adapted to deliver an output signal dependent on the correlation of a reception signal with the signal pattern, wherein the control unit is additionally adapted to control the pulse generator and the first encoding unit to form the coded pulse group from a predetermined plurality of single pulses in dependence on the values of the random number sequence in such a way that the single pulses of one and the same pulse group overlap in time after the pulse formation, and wherein, in the first encoding step, the transmitter effects a modulation of the time spacing between individual pulses of the pulse group in dependence on values of the random number sequence or the transmitter effects a modulation of the phase of the individual pulses in dependence on values of the random number sequence.

21. An ultra-wideband receiving apparatus as set forth in claim 20, wherein the correlation unit has a temporary memory for the signal pattern.

22. An ultra-wideband receiving apparatus as set forth in claim 20, wherein the pulse group generator has a filter device which is adapted to modify the pulse group in accordance with a predetermined filter characteristic.

23. An ultra-wideband receiving apparatus as set forth in claim 20, wherein the pulse group generator has a second encoding unit which is adapted to encode at least one bit value in the pulse group in accordance with a predetermined encoding rule.

24. An ultra-wideband receiving apparatus as set forth in claim 23, wherein the second encoding unit is adapted to additionally encode in a copy of the pulse group the complementary bit value corresponding to the predetermined encoding rule and in which the pulse group generator outputs a first and a second signal pattern with complementary bit values.

25. An ultra-wideband receiving apparatus as set forth in claim 20, wherein the correlation unit has two correlators of which a first correlator ascertains a correlation of the reception signal with the first signal pattern and a second correlator ascertains a correlation of the reception signal with the second signal pattern.

26. An ultra-wideband transmitting-receiving apparatus comprising an ultra-wideband transmitting apparatus as set forth in claim 15, and an ultra-wideband receiving apparatus having a pulse group generator comprising a pulse generator which is adapted to deliver individual pulses at a predeterminable time spacing from each other, a code generator which is adapted to deliver random signals dependent on values of a random number sequence, a first encoding unit which is adapted to encode an individual pulse delivered or to be delivered by the pulse generator in dependence on a current random signal of the delivered random signals, and a control unit which is connected to the pulse generator and which is adapted to actuate the pulse generator at predeterminable moments in time for the delivery of at least one signal pattern in the form of a pulse group with a predetermined number of encoded individual pulses at predetermined time spacings from each other, and with a correlation unit which is connected to the pulse group generator and adapted to deliver an output signal dependent on the correlation of a reception signal with the at least one signal pattern.

* * * * *

UNITED STATES PATENT AND TRADEMARK OFFICE
CERTIFICATE OF CORRECTION

PATENT NO. : 8,571,096 B2
APPLICATION NO. : 10/574720
DATED : October 29, 2013
INVENTOR(S) : Fischer Page 1 of 1

It is certified that error appears in the above-identified patent and that said Letters Patent is hereby corrected as shown below:

In the Claims

Column 12, claim 15, line 19, please remove "the" and insert --a-- therefor.

Column 12, claim 15, line 19, please insert --of the delivered random signals-- after the word "signal".

Column 12, claim 15, line 35, please remove "wherein, in the first encoding step, the transmitter effects a modulation of the time spacing between individual pulses of the pulse croup in dependence on values of the random number sequence or the transmitter effects a modulation of the phase of the individual pulses in dependence on values of the random number sequence" and replace with --wherein the encoding unit is adapted to effect a modulation of the time spacing between individual pulses of the pulse group in dependence on values of the random number sequence or the encoding unit is adapted to effect a modulation of the phase of the individual pulses in dependence on values of the random number sequence--.

Column 13, claim 20, line 3, please insert --of the delivered random signal-- after the word "signal".

Column 13, claim 20, line 24, please remove "wherein, in the first encoding step, the transmitter effects a modulation of the time spacing between individual pulses of the pulse group in dependence on values of the random number sequence of the transmitter effects a modulation of the phase of the individual pulses in dependence on values of the random number sequence" and replace with --wherein the first encoding unit is adapted to effect a modulation of the time spacing between individual pulses of the pulse group in dependence on values of the random number sequence or the first encoding unit is adapted to effect a modulation of the phase of the individual pulses in dependence on values of the random number sequence--.

Column 13, claim 20, line 61, please remove the word "the" and replace with --a--.

Signed and Sealed this
Tenth Day of June, 2014

Michelle K. Lee
*Deputy Director of the United States Patent and Trademark Office*